United States Patent
Amaya et al.

(10) Patent No.: US 6,242,863 B1
(45) Date of Patent: Jun. 5, 2001

(54) SPOT KILLER CIRCUIT (75) Inventors: Hideyuki Amaya; Masanori Tachibana, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/592,650

(22) Filed: Jun. 13, 2000

(30) Foreign Application Priority Data

Feb. 8, 2000 (JP) .................................................. 00-031053

(51) Int. Cl.<sup>7</sup> ...................................................... H01J 23/34
(52) U.S. Cl. ............................................... 315/1; 348/173
(58) Field of Search ................................. 315/1, 380, 381, 315/384; 348/173, 377, 380, 615, 617

(56) References Cited

U.S. PATENT DOCUMENTS

| | | | | |
|---|---|---|---|---|
| 5,084,657 | * | 1/1992 | Ueda | 315/384 |
| 5,677,730 | * | 10/1997 | Park | 348/377 |
| 5,682,083 | * | 10/1997 | Shin | 315/381 |
| 5,714,843 | * | 2/1998 | Youn | 315/1 |
| 5,920,339 | * | 7/1999 | Lee | 348/173 |
| 6,046,552 | * | 4/2000 | Yoon | 315/380 |

FOREIGN PATENT DOCUMENTS 3-231567    10/1991    (JP) .

* cited by examiner

*Primary Examiner*—Don Wong
*Assistant Examiner*—Thuy Vinh Tran
(74) *Attorney, Agent, or Firm*—Leydig, Voit & Mayer, Ltd.

(57) ABSTRACT

A signal for executing a spot killer operation is generated when power is turned OFF, and the signal for the spot killer operation is generated in the power ON state based on a control signal. By generating a signal for executing a spot killer operation and also by generating the signal for executing a spot killer operation in the power ON state based on a control signal, the spot killer operation can be executed using a spot killer circuit irrespective of whether power is ON or turned OFF.

4 Claims, 5 Drawing Sheets

SPOT KILLER CIRCUIT

FIELD OF THE INVENTION

The present invention relates to a cathode-ray tube (CRT) display system having a CRT display unit which provide displays with a CRT and other devices (a display unit other than the CRT, a video record device or the like), a video signal processing apparatus used in this CRT display system, and a spot killer circuit used in this video signal processing apparatus. More specifically, this invention relates to a CRT display system which executes a spot killer operation for neutralizing a high voltage in the CRT by flowing a current within the CRT, a video signal processing apparatus used in this CRT display system, and a spot killer circuit used in this video signal processing apparatus.

BACKGROUND OF THE INVENTION

Recently there is provided a CRT display system having a CRT display unit which provides displays with a CRT and other devices (such as a display unit other than a CRT and a video recorder) such as a television receiver incorporating a VCR therein. In the CRT display system described above, a spot killer operation is executed with a spot killer circuit to prevent spots from remaining on a screen when power is turned OFF.

In the television receiver incorporating a VCR therein, when images are recorded with a VCR while displays are being provided by the CRT, sometimes it is desired to delete a screen of the CRT without stopping the operation for recording video images. When a screen is to be deleted while recording video images, it is necessary to set only the CRT in the stand-by state when power is ON. Generally in order to set a CRT of a CRT display unit in the stand-by state when power is ON, sweeping in the horizontal or vertical direction is stopped, and generation of a high voltage in a flyback transformer as a source of a voltage for accelerating electrons within the CRT is stopped. However, there is the problem that, after the CRT is set in the stand-by state, spots remain on the screen until a high voltage in the CRT accumulated in the capacitor disappears due to discharging.

Figure 5:
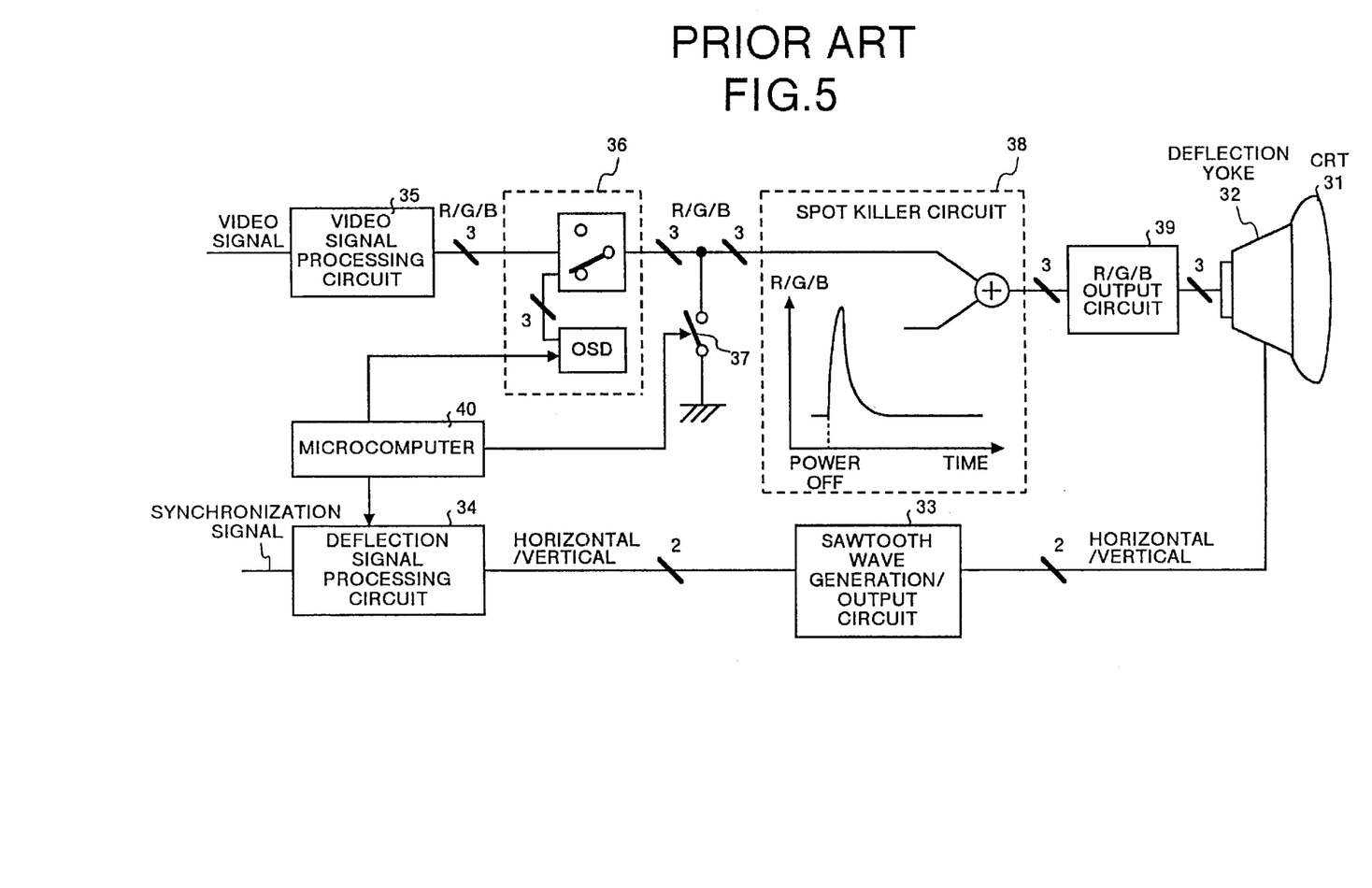
FIG. 5 shows general configuration of a CRT display system based on the conventional technology.

As the conventional type of CRT display system which can solve the problem described above, there is the one which executes a spot killer operation for neutralizing a high voltage in the CRT by flowing a current in the CRT using an OSD (On Screen Display) in a state where power is ON. FIG. 5 shows general configuration of the CRT display system.

This CRT display system comprises a CRT 31 providing displays, a deflection yoke 32 which sweeps an electron beam in the CRT 31, a sawtooth wave generation/output circuit 33 which generates a sawtooth wave for sweeping the electron beam and outputs the sawtooth wave to the deflection yoke 32, a deflection signal processing circuit 34 which receives a horizontal/vertical synchronization signal, generates a horizontal/vertical timing pulse for generation of a sawtooth wave (sawtooth wave generation timing pulse), and outputs the sawtooth wave generation timing pulse to the sawtooth wave generation/output circuit 33, a video signal processing circuit 35 which receives a video signal and converts the video signal to R/G/B signals, an OSD 36 which generates signals such as channel displays and executes switching between the R/G/B signals from the video signal processing circuit 35 and signals such as channel displays, a switch 37 which stops supply of the R/G/B signals, a spot killer circuit 38 which generates a pulse-like white signal based on the R/G/B signals when power is turned ON, an R/G/B output circuit 39 which receives the R/G/B signals from the spot killer circuit :38 and drives a cathode of the CRT 31, and a microcomputer 40 which stops supply of a sawtooth wave generation timing pulse by controlling the deflection signal processing circuit 34, stops supply of the R/G/B signals by controlling the switch 37, and executes a stop killer operation by controlling the OSD device 36.

In this CRT display system, when it is required to set the CRT 31 in the stand-by state in the power OFF state, the microcomputer 40 performs following operation. That is, (1) output white on all screens with the OSD device 36, (2) stop supply of a sawtooth wave generation timing pulse with the deflection signal processing circuit 34, and (3) stop supply of the R/G/B signals with the switch 37. When the operation (1) is executed, a maximum quantity of current is supplied from a cathode into the CRT 31, and when the operation (2) is executed, generation of a high voltage in a flyback transformer is stopped. When the operation (1) is executed, the current supplied from the cathode to the CRT 31 flows neutralizing a high voltage in the CRT as a source for the current itself, thus an equilibrium being achieved in the CRT (spot killer operation). Finally when the operation (3) is executed, supply of a current from the cathode is stopped. With this operation, a voltage loaded to the CRT 31 disappears with no spot generated on a screen of the CRT 31, and the CRT 31 is set in the stand-by state.

Further, in this CRT display system, when power is turned ON, the spot killer circuit 38 generates a one-shot pulse. Therefore, a current is supplied into the CRT 31 and flows neutralizing a high voltage in the CRT as a source for the current itself, thus an equilibrium being achieved in the CRT with generation of spots on a screen of the CRT prevented.

With the conventional technology as described above, however, the spot killer circuit 38 is used only when power is turned OFF. Therefore, when it is required to, set the CRT 31 in the stand-by state in the power ON state, a spot killer operation is executed with the OSD device 36. Thus, when a function such as the OSD function for outputting white on all screens under control by a microcomputer is not available, it is necessary to provide a power source unit for the spot killer circuit 38 separately from and in addition to a power source unit for the circuit (for the VCR or the like) having other functions and to cut turned OFF only power for the spot killer circuit 38. Accordingly, there occurs the problem that the circuit becomes complicated and the cost disadvantageously increases.

Further, an operation for generation of a signal for the spot killer operation is executed using the spot killer circuit 38 when power is turned OFF, and using the OSD device 36 when power is ON, which is disadvantageously redundant. Furthermore, control signals for the deflection signal processing circuit 34, switch 37, and OSD device 36 are different from each other, which makes the processing with a microcomputer for the spot killer operation complicated and also causes increase in size of the control program and cost.

SUMMARY OF THE INVENTION

It is an object of the present invention to provide a spot killer circuit, a video signal processing apparatus, and a CRT display system in which a power supply unit is shared by the spot killer circuit and a circuit having other functions to simplify the circuit configuration as well as to reduce the cost and the spot killer operation can be executed in the power ON state even when such functions as the OSD function are not available.

According to a spot killer circuit of one aspect of the present invention, a signal for the spot killer operation is generated when power is turned OFF, further, a signal for the spot killer operation is generated based on a control signal when power is ON. Thus, the spot killer operation can be executed using the spot killer circuit irrespective of whether power is ON or turned OFF.

According to a spot killer circuit of another aspect of the present invention, a first transistor drives a first resistor, a rectification unit generates a voltage difference between a collector and an emitter of a second transistor to accumulate electric charge in a capacitor, a switch unit grounds one edge of a third resistor based on a control signal from an external device such as a microcomputer, the third resistor pulls down a base of the second transistor when one edge of the switch unit is grounded or power is turned OFF, and the second transistor is turned ON when the base is pulled down by the third resistor, and drives the first resistor with a current from the capacitor. Accordingly, it is possible to generate a signal for the spot killer operation irrespective of whether power is ON or turned OFF.

According to a spot killer circuit of still another aspect of the present invention, a first transistor drives the first resistor, a rectification unit generates a voltage difference between a collector and an emitter of a second transistor to accumulate electric charge in a capacitor, a switch unit grounds the other edge of a second resistor based on a control signal from an external device such as a microcomputer, a third resistor pulls down a base of a second transistor when the other edge of the second resistor is grounded by the switch unit or when power is turned OFF, the second transistor is turned ON when the base is pulled down by the third resistor and drives the first resistor with a current from the capacitor. Accordingly, it is possible to generate a signal for the spot killer operation irrespective of whether power is ON or turned OFF.

Further, the control signal for executing the spot killer operation when power is turned ON is also used as a control signal for stopping supply of a timing pulse to the horizontal/vertical sawtooth wave generation circuit and also as a control signal for stopping supply of RGB signals to the CRT. Accordingly, the control becomes simple and size of the control program can be reduced.

According to a video signal processing apparatus of still another aspect of the present invention, a signal for the spot killer operation is generated when power is turned OFF, further, a signal for the spot killer operation is generated based on a control signal when power is ON. Thus, the spot killer operation can be executed using the spot killer circuit irrespective of whether power is ON or turned OFF. In addition, a power supply unit is shared between a spot killer circuit and a circuit having other functions.

According to a CRT display system of still another aspect of the present invention, a signal for the spot killer operation is generated when power is turned OFF, further, a signal for the spot killer operation is generated based on a control signal when power is ON. Thus, the spot killer operation can be executed using the spot killer circuit irrespective of whether power is ON or turned OFF. In addition a video signal processing apparatus is shared between a CRT unit and other devices (such as a VCR).

Other objects and features of this invention will become apparent from the following description with reference to the accompanying drawings.

DESCRIPTION OF THE PREFERRED EMBODIMENTS

A spot killer circuit, a video signal processing apparatus, and a CRT display system each according to one embodiment of the present invention are described in detail below with reference to the related drawings. The present invention is not limited to the embodiment described below.

Figure 1:
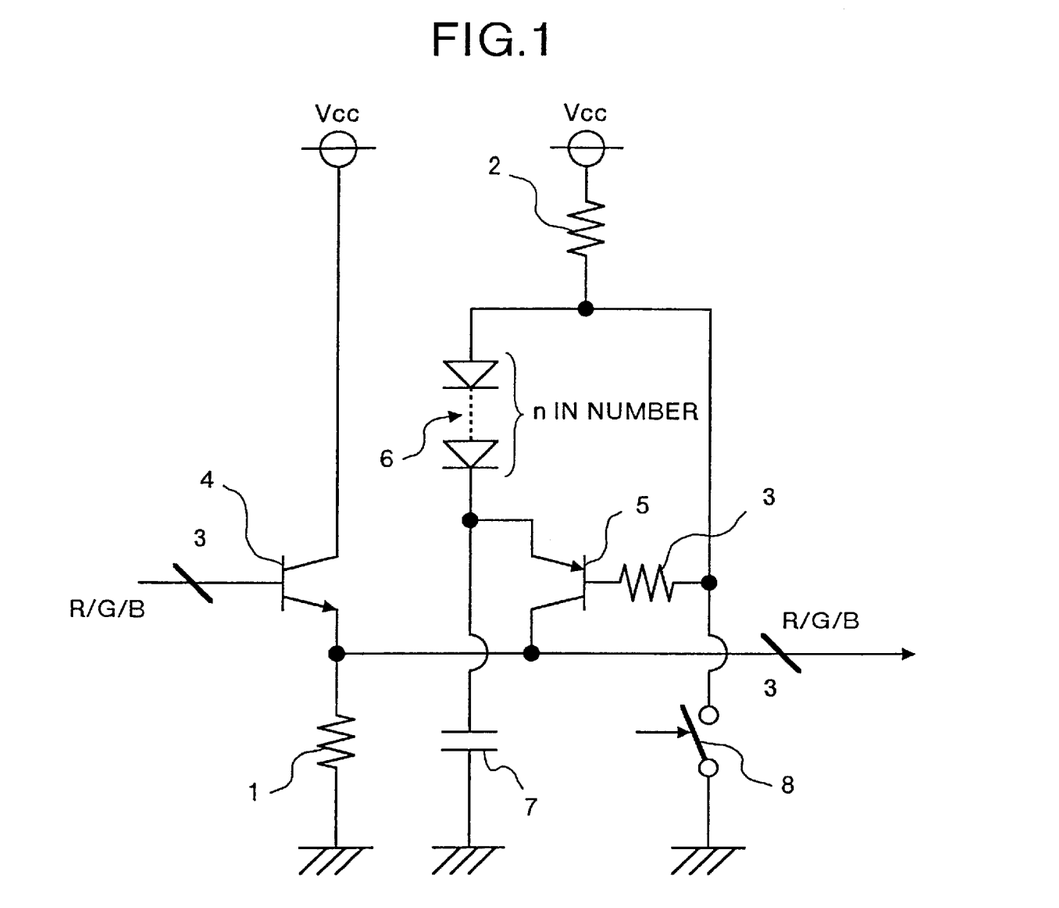
FIG. 1 is a circuit diagram showing a general configuration of a spot killer circuit according to one embodiment of the present invention.

FIG. 1 is a circuit diagram showing general configuration of a spot killer circuit according to one embodiment of the present invention. This spot killer circuit has a resistor 1 with one edge thereof grounded, an NPN transistor 4 with an emitter thereof connected to the other edge of the resistor 1 and also with a collector thereof connected to a power supply unit which receives R/G/B signals described hereinafter from a base, a resistor 2 with one edge thereof connected to the power supply unit, a capacitor 7 with one edge thereof grounded, at least one (n pieces) diode 6 which flows a current to the capacitor 7, an PNP transistor 5 with an emitter thereof connected to the other edge of the capacitor 7 and a collector thereof connected to the other edge of the resistor 1, a resistor 3 provided between the other edge of the resistor 2 and a base of the transistor 5, and a switch 8 which grounds or releases the other edge of the resistor 2 based on a control signal described below.

Operations of the spot killer circuit are described below with reference to the above-explained structure. In this spot killer circuit, in the ordinary power ON state, the switch 8 is set in the released state. The NPN transistor 4 receives R/G/B signals and outputs the R/G/B signals driving the resistor 1. On the other hand, the PNP transistor 5 is set in the OFF state because the base voltage becomes higher than the emitter voltage due to voltage drop because of the diode 6, and does not drives the resistor 1. Further a current flow from a power supply unit via the resistor 2 and diode 6 to the capacitor 7, and the capacitor 7 is set in the normal state after an electrode in the not-grounded side is charged to the voltage of (Vcc−n·Vbe) . The Vcc indicates a power voltage, while Vbe indicates a voltage dropped by one diode.

When power is turned OFF, the NPN transistor 4 is turned OFF, and stops driving the resistor 1. On the other hand, the PNP transistor 5 is turned ON because the base voltage becomes lower, and the capacitor 7 discharges the electric load. The current discharged from the capacitor 7 flows via a collector of the PNP transistor 5 to the resistor 1, and a pulse-like white signal is generated at the R/G/B signal output terminal. Sweeping in the horizontal/vertical, direction is stopped simultaneously when power is turned ON, so that generation of a high voltage in the flyback transformer is stopped. A current generated based on the pulse-like white signal flows in the CRT with a residual high voltage in the CRT neutralized (spot killer operation), and because of this operation, a spot does not appear on the CRT screen and the CRT is set in the stand-by state.

In the normal state where the capacitor 7 is being charged in the power ON state, even when the switch 8 is short-circuited based on a control signal, the PNP transistor 5 turns ON because the base voltage becomes lower with the capacitor 7 released. A discharged current from the capacitor 7 flows via a collector of the PNP transistor 5 to the resistor 1, and a pulse-like white signal is generated at the R/G/B output terminal.

Figure 2:
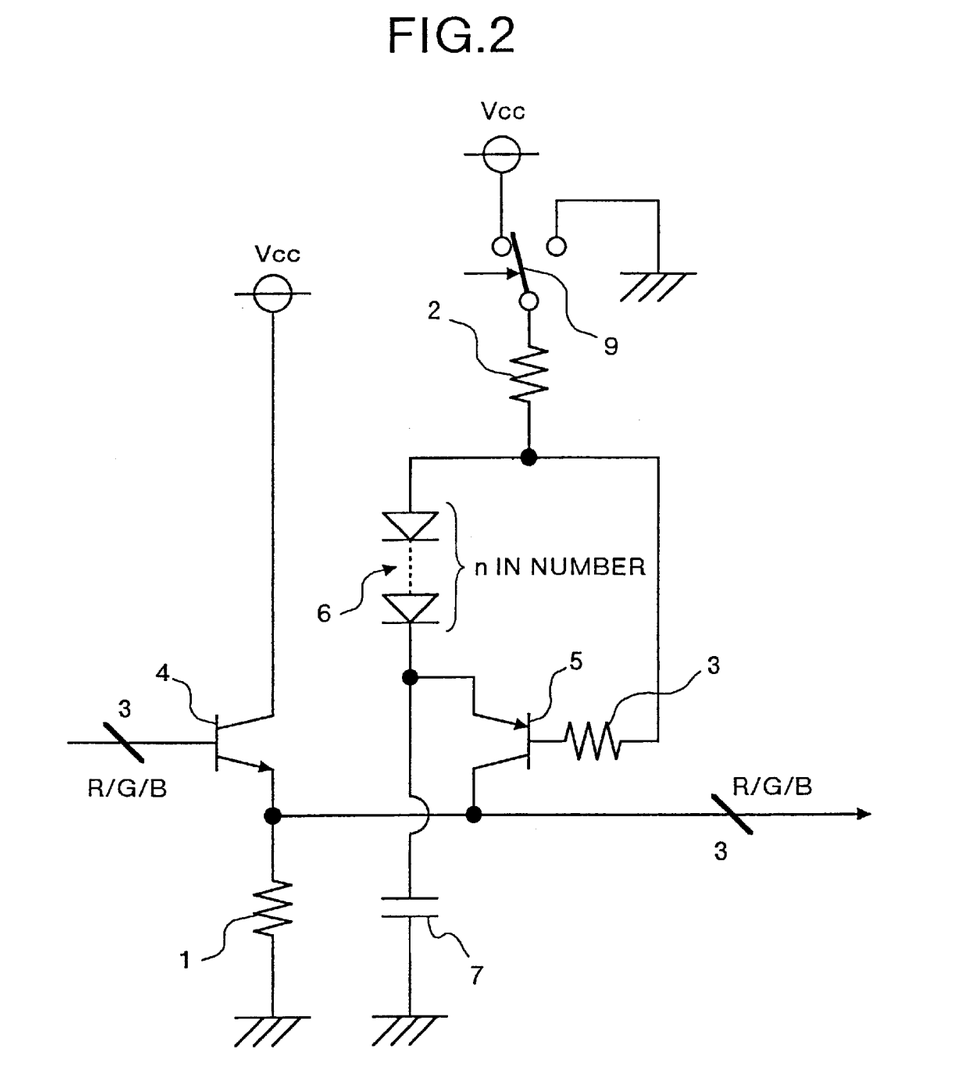
FIG. 2 is a circuit diagram showing a general configuration of another spot killer circuit according to this embodiment.

FIG. 2 is a circuit diagram showing general configuration a of another spot killer circuit according to this embodiment. The same reference numerals are assigned to the same portions as those shown in FIG. 1, and description thereof is omitted herein. This spot killer circuit has a switch 9 provided in the side where the resistor 2 is connected to a power supply unit in place of the switch 8 which grounds or releases a section between the resistors 2 and 3. The switch 9 grounds one edge of the resistor 2 or connects the edge to a power supply unit.

Operations of the spot killer circuit are described below with reference to the above-explained structure. In this spot killer circuit, in the normal power ON state, the switch 9 connects one edge of the resistor 2 to a power supply unit. The NPN transistor 4 receives R/G/B signals and outputs the R/G/B signals driving the resistor 1. On the other hand, the PNP transistor 5 turns OFF because the base voltage becomes lower than the emitter voltage due to voltage drop by the diode 6, and does not drives the resistor 1. A current flows from the power supply unit via the resistor 2 and diode 6 to the capacitor 7, and the capacitor 7 is set in the normal state after the electrode in the side where one edge thereof is not grounded is charged up to a voltage of (Vcc−n·Vbe).

When power is turned ON, the NPN transistor 4 turns OFF and stops driving the resistor 1. On the other hand, the PNP transistor 5 turns ON because the base voltage drops with the capacitor 7 discharged. The current discharged from the capacitor 7 flows via a collector of the PNP transistor 5 to the resistor 1, and a pulse-like white signal is generated at the R/G/B signal output terminal. Sweeping in the horizontal/vertical direction stops simultaneously when power is turned OFF, so that generation of a high voltage in the flyback transformer is stopped. A current generated in response to the pulse-like white signal flows in the CRY with the residual high voltage in the CRT neutralized (spot killer operation), so that a spot does not appear on the CRT screen and the CRT is set in the stand-by state.

In the normal state where power is ON and the capacitor is being charged, even when the switch 9 grounds one edge of the resistor 2, the PNP transistor 5 turns ON because the base voltage becomes lower with the capacitor 7 charged. The current discharged from the capacitor 7 flows via a collector terminal of the PNP transistor 5, and a pulse-like white signal is generated at the R/G/B signal output terminal.

Figure 3:
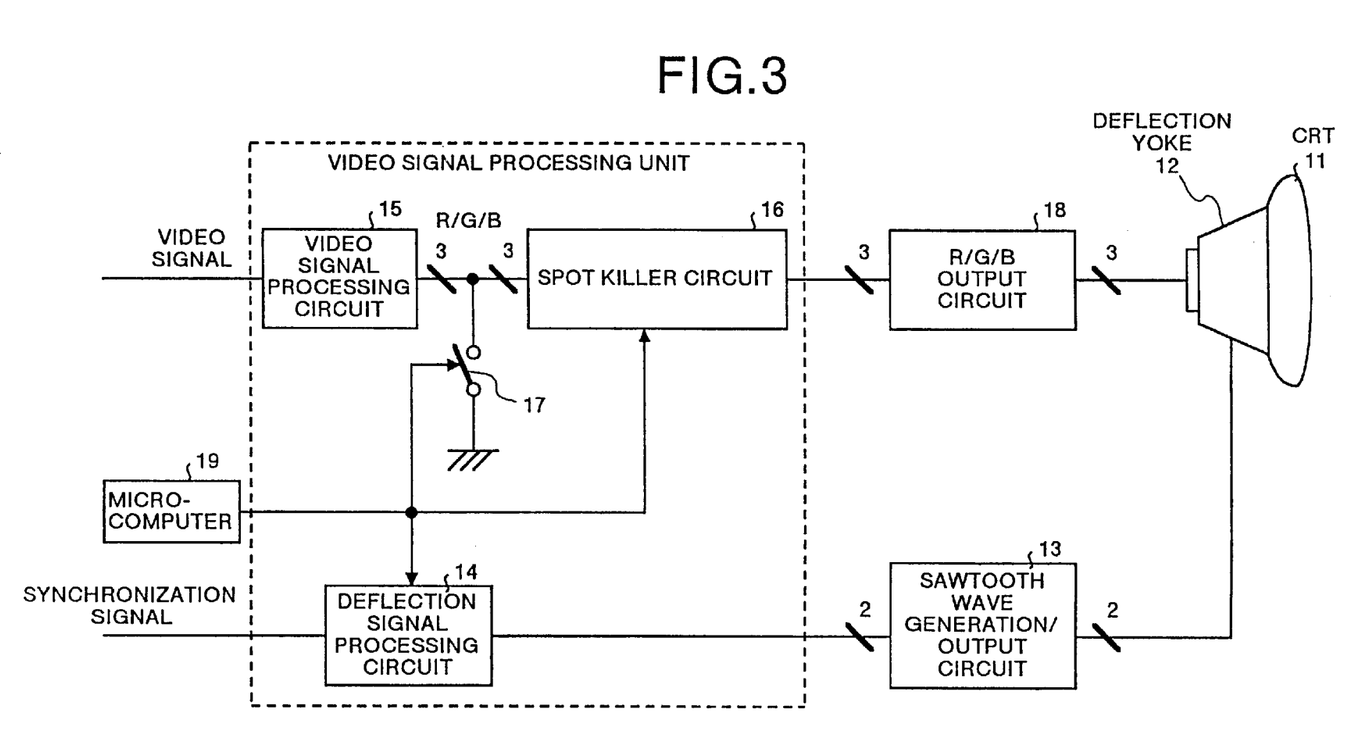
FIG. 3 is a circuit diagram showing a general configuration of a CRT display system according to this embodiment.

FIG. 3 shows general configuration of a CRT display unit according to this embodiment. This CRT display unit comprises a CRT 11, a deflection yoke 12 which sweeps an electron beam in the CRT 11, a sawtooth wave generation/output circuit 13 which generates a sawtooth wave for sweeping an electron beam and outputs the sawtooth wave to the deflection yoke 12, a deflection signal processing circuit 14 which generates a horizontal/vertical timing pulse (sawtooth wave generation timing pulse) for giving timing for generation of the sawtooth wave and outputs the timing pulse to the sawtooth wave generation/output circuit 13, a video signal processing circuit 15 which converts a video signal to an R/G/B signal and outputs the R/G/B signal, a spot killer circuit 16 which receives the R/G/B signal from the R/G/B signal from the video signal processing circuit 15, outputs the R/G/B signal, and operates based on a control signal (generates a pulse-like white signal for the spot killer operation) not only when power is turned OFF, but also when power is ON, a switch 17 which stops supply of the R/G/B signal from the video signal processing circuit 15, an R/G/B signal output circuit 18 which receives the R/G/B signal from the spot killer circuit 16 and drives a cathode of the CRT 11, and a microcomputer 19 which stops supply of the sawtooth wave generation timing pulse controlling the deflection signal processing circuit 14, stops supply of the R/G/B signal controlling the switch 17, and executes the spot killer operation controlling the spot killer circuit 16.

The video signal processing circuit 15 receives a video signal, converts the video signal to an R/G/B signal, and outputs the R/G/B signal. The spot killer circuit 16 receives the R/G/B signal from the video signal processing circuit 15 and outputs the R/G/B signal, and operates based on a control signal from the microcomputer 19 not only when power is ON, but also when power is turned OFF. The spot killer circuit 16 is, for instance, the spot killer circuit as shown in FIG. 1 and FIG. 2. The switch 17 stops supply of the R/G/B signal from the video signal processing circuit 15 based on a control signal from the microcomputer 19. The R/G/B signal output circuit 18 receives the R/G/B signal from the spot killer circuit 16 and drives a cathode of the CRT 11.

The deflection signal processing circuit 14 inputs a horizontal/vertical synchronization signal, and outputs a sawtooth wave generation timing pulse, and outputs the pulse to the sawtooth wave generation/output: circuit 13. Further, the deflection signal processing circuit 14 stops supply of the sawtooth wave generation timing pulse to the sawtooth wave generation/output circuit 13 based on a control signal from the microcomputer 19. The sawtooth wave generation/output circuit 13 generates a sawtooth wave for sweeping an electron beam and outputs the sawtooth wave to the deflection yoke 12. The deflection yoke 12 sweeps an electron beam in the CRT 11 with the sawtooth wave from the sawtooth wave generation/output circuit 13. With this operation, an electron beam from a cathode of the CRT 11 is swept, and an image is displayed on a screen of the CRT 11.

The video signal processing circuit 15, spot killer circuit 16, deflection signal processing circuit 14, and switch 17 constitute a video signal processing apparatus. A circuit for executing various types of processing may be provided in the video signal processing apparatus, and components of the video signal processing apparatus share a power supply unit. A control signal for starting the spot killer circuit 16 is also used as a control signal (a control signal to the switch 17) for masking an R/G/B output and as a control signal for stopping supply of the sawtooth wave generation timing pulse, and the microcomputer 19 can set the CRT in the stand-by state executing the spot killer operation only by outputting a single control signal.

Operations of the CRT display unit are described below with reference to the above-explained structure. In this CRT display unit, in the normal power ON state, the switch 17 is set in the released state. When a video signal is inputted, the video signal is converted by the video signal processing circuit 15 to an R/B/G signal, and the converted R/G/B signal is inputted via the spot killer circuit 16 into the R/G/B output circuit 18, and a cathode of the CRT 11 is driven. On the other hand, a sawtooth wave generation timing pulse is generated in the deflection signal processing circuit 14 in response to input of a horizontal/vertical synchronization signal, while a sawtooth wave is generated in the sawtooth wave generation/output circuit 13 and is outputted to the deflection yoke 12. The deflection yoke 12 sweeps an electron beam in the CRT 11 with a sawtooth wave from the sawtooth wave generation/output circuit 13, and an image is displayed on a screen of the CRT 11.

Sweeping in the horizontal/vertical direction is stopped simultaneously when power is turned OFF, so that generation of a high voltage in a flyback transformer not shown is stopped. Further a pulse-like white signal is outputted from the spot killer circuit 16, a current generated in response to this pulse-like white signal flows in the CRT with a high voltage remaining in the CRT neutralized (spot killer operation), a spot does not appear on a screen of the CRT, and the CRT is set in the stand-by state.

When it is necessary to set the CRT 11 in the stand-by state in the power ON state, the microcomputer 19 issues a control signal to the deflection processing circuit 14, switch 17, and spot killer circuit 16. With this operation, supply of the R/G/B signal is stopped, also supply of the sawtooth wave generation timing pulse is stopped, and generation of a high voltage in the CRT 11 is stopped. At the same time, the spot killer circuit 16 is activated, and a pulse-like white signal is generated at the R/G/B output terminal. With this operation, the spot killer operation is executed, and generation of a spot on a screen of the CRT 11 can be prevented. When generation of a pulse-like white signal is stopped, all of the voltage loaded to the CRT 11 disappears, and the CRT 11 is set in the stand-by state.

Figure 4:
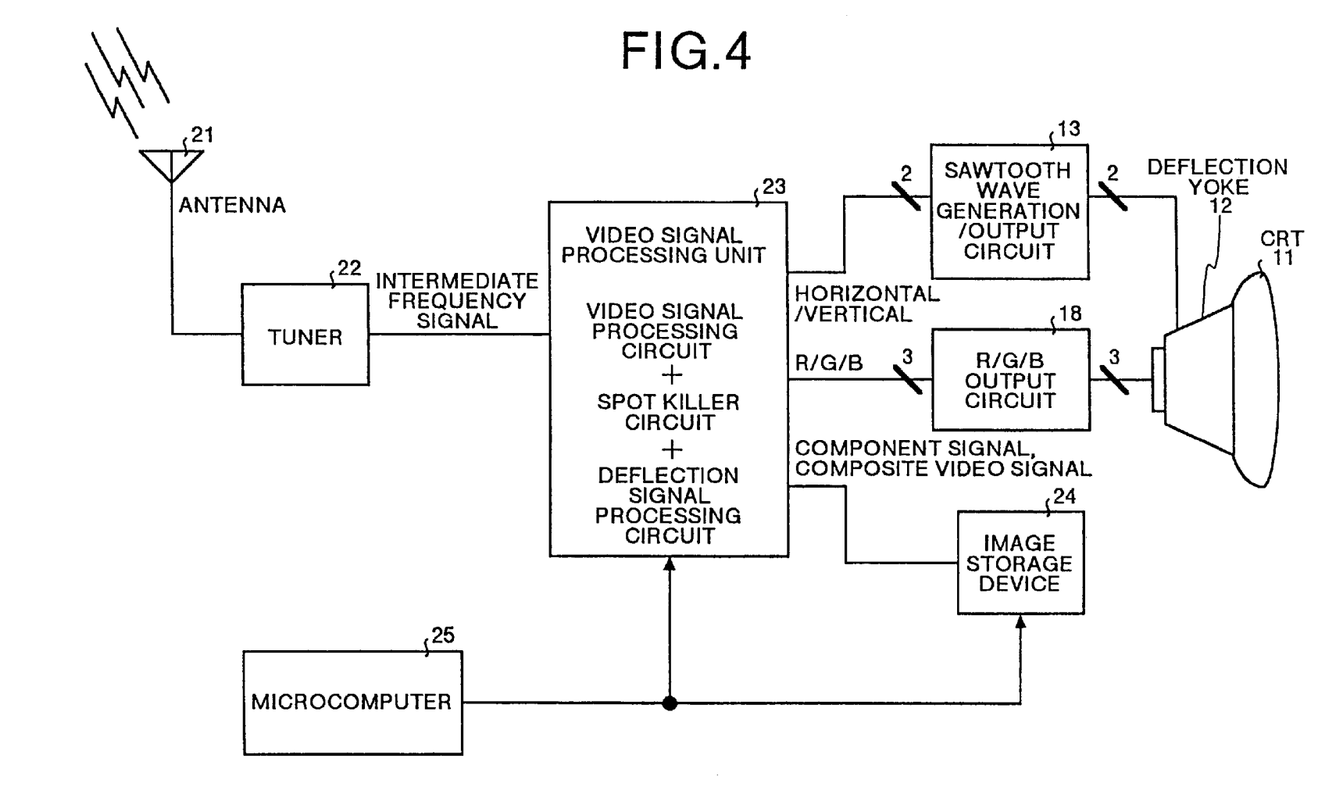
FIG. 4 shows general configuration of a CRT display system according to this embodiment.

FIG. 4 shows general configuration of a CRT display system according to this embodiment. In this CRT display system, an image storage device 24 is added to the CRT display unit shown in FIG. 3. The same reference numerals are added to the same sections as those shown in FIG. 3, and description thereof is omitted herefrom.

This CRT display system comprises an antenna 21, a tuner 22, an image storage device 24, a video signal processing apparatus 23 which receives an intermediate frequency signal from the tuner 22, generates a sawtooth wave generation timing pulse and outputs the pulse to the sawtooth wave generation/output circuit 13, generates an R/G/B signal and outputs the R/G/B signal to the R/G/B output circuit 18, and further generates a component signal and a composite video signal and outputs the signals to the image storage device 24, and a microcomputer 25 which controls each of the components.

The video signal processing apparatus 23 has, in addition to the video signal processing apparatus shown in FIG. 3, a circuit which generates a component signal, a composite video signal or the like and outputs the signals to the image storage device 24. Further the video signal processing apparatus 23 has a circuit for executing various types of video signal processing and the circuits shares a power supply unit. The video signal processing apparatus 23 further receives an intermediate frequency signal from the tuner 22, and generates and outputs a sawtooth wave generation timing pulse, an R/G/B signal, a component signal, a composite signal, or the like.

There is no specific limitation over a type of the image storage device 24, and an image storage device using a magnetic tape such as a VCR or a using an optical disk or a magnetic disk such as a DVD or a hard disk is allowable. The video storage device 24 receives a component signal, a composite video signal or the like from a video signal processing apparatus and stores the signals therein. As described above, the image signal processing unit 23 is used not only in the CRT display unit, but also in the image storage device 24. Namely the video signal processing apparatus 23 is shared by the CRT display unit and the image storage device 24. The microcomputer 25 executes the same operations as those executed by the microcomputer 19, and further executes the operations for controlling the image storage device 24.

The antenna 21 and tuner 22 are well known to those skilled in the art, and description thereof is omitted herefrom. A CRT display system having the image storage device 24 was described above, as an example, but a CRT display system having a display unit other than a CRT may be used.

As described above, with this embodiment, not only when power is turned OFF, but also when power is ON, the spot killer circuit operates based on a control signal, so that it is not required to disconnect power for the spot killer circuit for operating the spot killer circuit, and further it is possible to make the spot killer circuit operate while other circuit function is operating even when a power supply unit is shared by the spot killer circuit and a circuit having the other function. Sharing a power supply unit by the circuits is also advantageous for using ICs therein. Further even when the OSD device is not available, it is possible to execute the spot killer operation in the power ON state. Further as the spot killer operation in the power ON state is executed based on a control signal, so that the control step is simplified to a single process, and it is possible to reduce a work load to the microcomputer, to simplify the software, and further to reduce a storage capacity for the software (of a ROM or the like).

By incorporating a spot killer circuit which operates also based on a control signal not only when power is turned OFF, but also when power is ON in a video signal processing apparatus, it becomes possible to share a power supply unit by a spot killer circuit and a circuit having other functions, so that operations of each circuit can be controlled independently without being restricted by a power supply unit, and further it is possible to share a video signal processing apparatus incorporating the spot killer circuit with a device other than a CRT display unit, which makes it possible to reduce the cost. Further by using a video signal processing apparatus incorporating spot killer circuit in a CRT display unit, it is possible to share the video signal processing apparatus with the CRT display unit and other devices, which makes it possible to build a low cost system.

As described above, according to the spot killer circuit of one aspect of the present invention, a signal for the spot killer operation is generated when power is turned OFF, further, a signal for the spot killer operation is generated based on a control signal when power is ON. Thus, the spot killer operation can be executed using the spot killer circuit irrespective of whether power is ON or turned OFF. Because of this feature, there is provided the advantage that, even when the OSD function or the like is not available, a circuit can be simplified by sharing a power supply unit with a spot killer circuit and a circuit having other functions, and a spot killer operation can be executed in the power ON state with reduced cost.

According to a spot killer circuit of another aspect of the present invention, the first transistor drives the first resistor, the rectification unit generates a voltage difference between a collector and an emitter of the second transistor to accumulate electric charge in the capacitor, the switch unit grounds one edge of the third resistor based on a control signal from an external device such as a microcomputer, the third resistor pulls down a base of the second transistor when one edge of the switch unit is grounded or power is turned OFF, and the second transistor is turned ON when the base is pulled down by the third resistor, and drives the first resistor with a current from the capacitor. Accordingly, it is possible to generate a signal for the spot killer operation irrespective of whether power is ON or turned OFF. Because of this feature, there is provided the advantage that, even when the OSD function or the like is not available, a circuit can be simplified by sharing a power supply unit with a spot killer circuit and a circuit having other functions, and a spot killer operation can be executed in the power ON state with reduced cost.

According to a spot killer circuit of still another aspect of the present invention, the first transistor drives the first resistor, the rectification unit generates a voltage difference between a collector and an emitter of the second transistor to accumulate electric charge in the capacitor, the switch unit grounds the other edge of the second resistor based on a control signal from an external device such as a microcomputer, the third resistor pulls down a base of the second transistor when the other edge of the second resistor is grounded by the switch unit or when power is turned OFF, the second transistor is turned ON when the base is pulled down by the third resistor and drives the first resistor with a current from the capacitor. Accordingly, it is possible to generate a signal for the spot killer operation irrespective of whether power is ON or turned OFF. Because of this feature, there is provided the advantage that, even when the OSD function or the like is not available, a circuit can be simplified by sharing a power supply unit with a spot killer circuit and a circuit having other functions, and a spot killer operation can be executed in the power ON state with reduced cost.

Further, the control signal for executing the spot killer operation when power is turned ON is also used as a control signal for stopping supply of a timing pulse to the horizontal/vertical sawtooth wave generation circuit and also as a control signal for stopping supply of RGB signals to the CRT. With this feature, there is provided the advantage that control is very simple and size of the control program can be reduced.

According to a video signal processing apparatus of still another aspect of the present invention, a signal for executing the spot killer operation is generated with the spot killer circuit when power is either ON or turned OFF, and a power supply unit is shared by the spot killer circuit and a circuit having other functions, so that, even when the OSD function is the like is not available, a circuit can be simplified and the spot killer operation can be executed in the power ON state with the reduced cost. Further as a control signal for executing the spot killer operation in the power ON state is also used as a control signal for stopping supply of a timing pulse to the horizontal/vertical sawtooth wave generation circuit and/or as a control signal for stopping supply of an R/G/B signal to a CRT. Because of this feature, there is provided the advantage that it is possible to reduce size of the control program and the cost.

According to a CRT display system of still another aspect of the present invention, a signal for the spot killer operation is generated with the spot killer circuit when power is either ON or turned OFF, and a power supply unit is shared by the spot killer circuit and a circuit having other functions, and further a video signal processing apparatus is shared by the CRT unit and other devices (such as a VCR), so that, even when the OSD function is the like is not available, a circuit can be simplified and the spot killer operation can be executed in the power ON state with the reduced cost. Further as a control signal for executing the spot killer operation in the power ON state is also used as a control signal for stopping supply of a timing pulse to the horizontal/vertical sawtooth wave generation circuit and/or as a control signal for stopping supply of an R/G/B signal to a CRT. Because of this feature, there is provided the advantage that it is possible to reduce size of the control program and the cost.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A spot killer circuit comprising:

a first resistor having a first end connected to a ground potential;

a power supply unit which supplies power;

a first transistor having an emitter connected to a second end of said first resistor, a collector connected to said power supply unit, and a base receiving RGB signals;

a second resistor having a first end connected to said power supply unit;

a capacitor having a first end connected to the ground potential;

a rectification unit connected between a second end of said second resistor and a second end of said capacitor, said rectification unit providing a current to said capacitor;

a second transistor having an emitter connected to the second end of said capacitor, a base, and a collector connected to the second end of said first resistor;

a third resistor connected between the second end of said second resistor and the base of said second transistor; and a switch unit connected between the second end of said second resistor and a ground potential, connecting and disconnecting said third resistor to the ground potential in response to a control signal.

2. The spot killer circuit according to claim 1, wherein the control signal stops supply of at least one of a timing pulse to a sawtooth wave generation circuit and RGB signals to a cathode-ray tube (CRT).

3. A spot killer circuit comprising:

a first resistor having a first end connected to a ground potential;

a power supply unit which supplies power;

a first transistor having an emitter connected to a second end of said first resistor, a collector connected to said power supply unit, and a base receiving RGB signals;

a second resistor;

a capacitor having a first end connected to the ground potential;

a rectification unit connected between a first end of said second resistor and a second end of said capacitor, said rectification unit supplying a current to said capacitor;

a second transistor having an emitter connected to the second end of said capacitor, a base, and a collector connected to the second end of said first resistor;

a third resistor connected between the first end of said second resistor the base of said second transistor; and a switch unit connected between a second end of said second resistor, and, selectably, to a ground potential, and to said power supply unit, in response to a control signal.

4. The spot killer circuit according to claim 3, wherein the control signal stops supply of at least one of a timing pulse to a sawtooth wave generation circuit and RGB signals to a cathode-ray tube (CRT).

* * * * *